March 20, 1956     H. M. OGLE     2,738,648
LIQUID FUEL CONTROL SYSTEM FOR A ROCKET ENGINE
Filed June 14, 1949
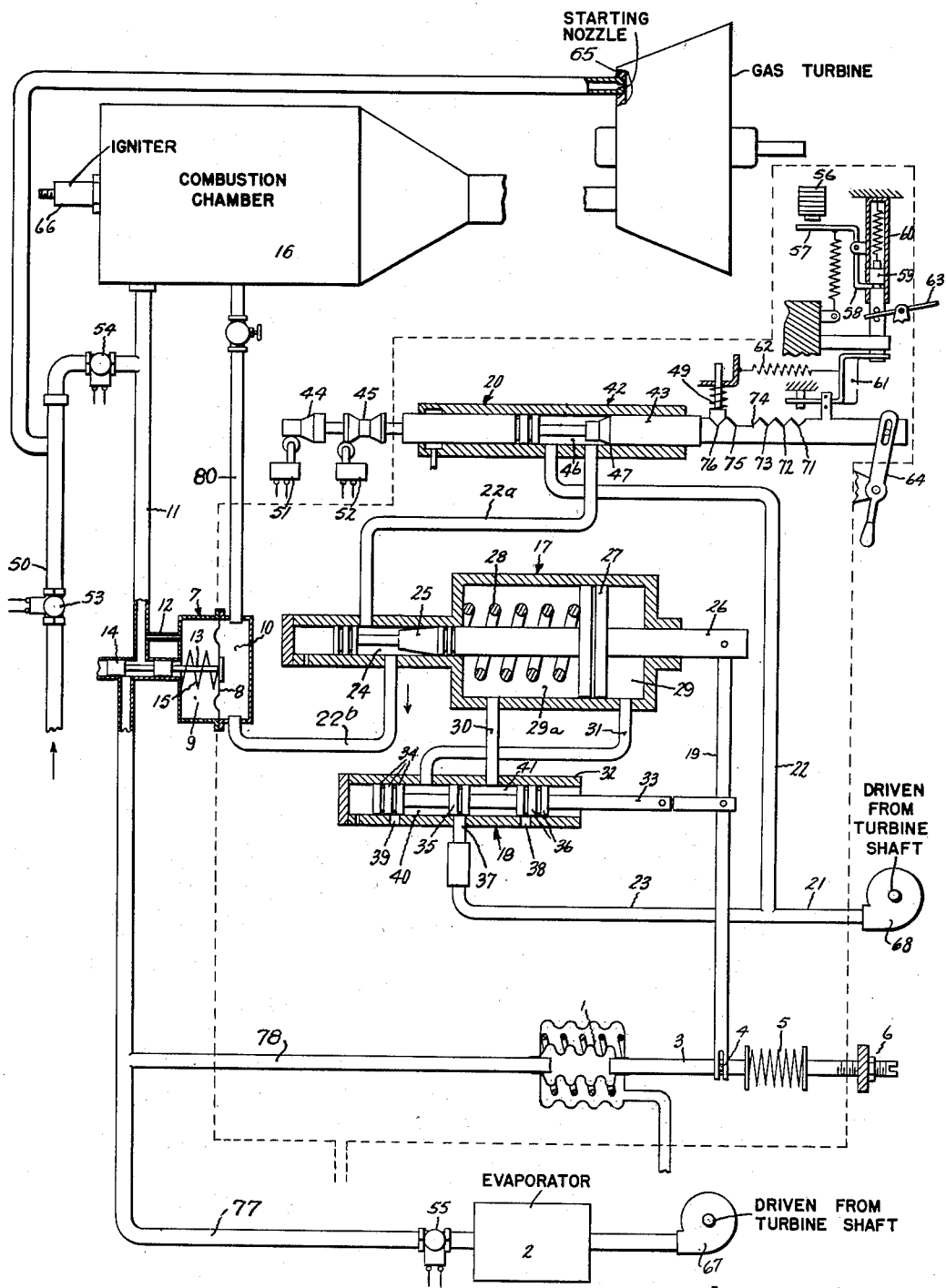
Inventor:
Hugh M. Ogle
by Richard E. Haley
His Attorney.

United States Patent Office 2,738,648
Patented Mar. 20, 1956

2,738,648

LIQUID FUEL CONTROL SYSTEM FOR A ROCKET ENGINE

Hugh M. Ogle, Schenectady, N. Y., assignor to General Electric Company, a corporation of New York Application June 14, 1949, Serial No. 98,992

3 Claims. (Cl. 60—39.27)

This invention relates to a control system for a rocket engine and in particular to a mechanism for regulating the fuel supply to the main jets of a rocket power plant for an airplane.

In existing types of rocket engines of the subject class, liquid fuel and oxidizer are supplied to the main jets at a pressure of approximately 300 lbs. per sq. in. absolute. The liquids are stored in heavy thick-walled storage tanks and then bled off at the operating pressure. The weight of the tanks, however, is a disadvantage and because of them present rocket planes are limited to a flight duration of approximately 3 minutes.

By eliminating the heavy storage tanks, storing the liquids at atmospheric pressure and then increasing their pressures by means of fuel pumps, it is possible to carry enough fuel to greatly increase the duration of flight.

The prime object of this invention is to eliminate the heavy storage tanks required for present rocket engines.

A further object is to provide a mechanism that regulates the pressures, and supplies the desired amount of liquids to the main jet of a rocket engine.

In order to understand the application of the subject invention, it is necessary to consider its location in the broad operating principles of the mechanism employed to eliminate the heavy storage tanks for the fuel and oxidizer.

For the operation of a rocket engine according to the subject principles, a gas turbine is utilized to drive directly two liquid pumps—one for the liquid fuel, the other for a liquid oxidizer. The main output of each of the pumps is sent directly to the main jets of a rocket engine, but an ancillary line is used to bleed off some of the fuel and oxygen in the liquid state for use in a feed-back system that in turn drives the gas turbine.

The feed-back system comprises a means of bleeding oxidizer and alcohol from the main pumps, metering them through the subject control system, burning the alcohol and oxidizer in a combustion chamber, and sending the products of this combustion chamber into the gas turbine that directly drives the liquid pumps.

The control system which is the subject matter of the present invention includes in its broadest form a means of controlling the liquid that is bled from the pumps and thereby regulating the amount of combustible products sent into the combustion chamber which, in turn, regulates the speed of the gas turbine by controlling the products of combustion of the combustion chamber utilized to drive the turbine.

In the drawing the single figure is a schematic drawing which explains some of the basic principles of the system as a whole and the operating principles of the subject control system.

The bellows 1, for example, is the starting point for the control system. That is, the control system reacts to the position of the bellows and thereby controls the speed of a gas turbine. The bellows 1 is connected to an oxygen supply through lines 77 and 78 which is bled from an oxygen pump 67 driven by the gas turbine. If liquid oxygen, however, were allowed to enter the bellows, its exceedingly low temperature—in the order of 270° below zero— would freeze the metal operating parts of the bellows and prevent satisfactory operation. Consequently, the liquid oxygen is first passed through an evaporator 2 and transformed to a gaseous state which is at a temperature that will not harmfully affect the bellows. The pressure drop through evaporator 2 is very small and, consequently, the bellows gives a good indication of the actual pressure of the liquid oxygen in the outlet side of the oxygen pump. It has been found that if the pressure of the liquid oxygen is controlled, the pressure of the liquid fuel is regulated to the extent that satisfactory performance takes place within the rocket engine.

A rod 3 is attached to the moving end of bellows and moves with the expansible end of the bellows. A pin 4 on rod 3 is the actual starting point of the subject control mechanism. The rod 3 is biased by a spring 5 and a set screw 6 so that there is a continual pressure on rod 3, causing it to force the expansible end of the bellows to a retracted position. The control system functions relative to the position of pin 4, which attains the position indicated in the drawing when optimum liquid oxygen pressure is being supplied to the main jet of the rocket engine. At this position steady state conditions exist, and the control system does not vary the speed of the gas turbine so long as the pin 4 keeps that position.

The next element to be described is the oxygen flow control device 7 which comprises a cylinder having a double diaphragm 8 therein which divides the cylinder into an oxygen compartment 9 and a fuel compartment 10. The pressure of the oxygen in compartment 9 is equal to the pressure of the oxygen in the inlet tube 11, since the tube and the compartment are connected by the passageway 12. The position of the diaphragm 8, which is regulated by the difference in pressure between the fuel in compartment 10 and the oxygen in compartment 9, controls the position of a rod 13, which in turn regulates the position of a piston or valve piece 14. The valve piece 14 throttles the oxygen as it passes into the inlet tube 11, and when spring 15 engaging one side of diaphragm 8 is properly biased, the pressure of the oxygen in compartment 9 is equal to the pressure of the fuel in compartment 10.

For optimum burning condition in a combustion chamber 16, it has been found that it is necessary to keep the pressure of the oxygen and the fuel equal. The oxygen control device 7 performs this function, no matter how the pressure of the liquid alcohol is regulated before it enters the oxygen control device. The regulation of the pressure of the liquid alcohol controls the speed of the turbine, since the oxygen supply varies directly with the supply of fuel and, consequently, the products of combustion of the combustion chamber vary with the pressure of the liquid fuel.

The control system responds to the position of pin 4, regulates the pressure of the fuel going into the oxygen control device 7, and thereby regulates the speed of the turbine. The turbine speed varies the pressure of the liquid oxygen, the position of the bellows, and the pin 4, so that the entire system is completely inter-related.

For clarity, description of the control system will be divided into two parts—the automatic portion, and the manual control portion.

The automatic portion comprises a power cylinder 17, a pilot valve 18, and a fulcrum arm 19. The fulcrum arm which responds to the position of pin 4, moves the pilot valve which, in turn, operates the power piston.

The following description of the flow of the fluid fuel from the fuel pump 68 through the control system and into the combustion chamber will better show the function of the control system in relation to the fuel. The fuel enters the control system through a conduit or pipe 21, where it is divided into a main fuel supply line 22 and a control fuel supply line 23. Fuel in the main fuel supply line 22 goes through a manually operated control valve 20, which will be hereinafter described, to a chamber 24, the size opening of which is controlled by a piston 25 operated by the power cylinder 17. The fuel, after it passes chamber 24, is directed through the oxygen control device 7 and into the combustion chamber 16 through line 80, where it is burned.

When the manual control valve 20 is in the wide open position, as shown in the attached drawing, the automatic control system is in complete control of the metering of the fuel to the combustion chamber and, consequently, the speed of the gas turbine. The piston 25, which varies the opening of the chamber 24, is securely fastened to a piston rod 26 which, in turn, is affixed to a piston 27. A spring 28 biases the piston 27 to its normally open position. That is, the spring 28 acts upon piston 27 so as to cause piston 25 to open chamber 24.

In addition to the pressure of the spring 28, the piston 27 is also influenced by the pressure of the liquid entering either cylinder 29 or cylinder 29A through a pair of tubes 30 and 31. The flow of the liquid through tubes 30 and 31 is controlled by the operation of pilot valve 18 which functions in the manner hereinafter described.

The pilot valve 18 comprises a hollow cylindrical member 32 in which is slidably arranged a rod 33 having three pistons 34, 35 and 36 attached thereto. There are five fuel openings in the cylindrical member 32 comprising, in addition to the openings for the two tubes 30 and 31, a main inlet 37 for the fuel from line 23, and two outlets 38 and 39 which drain fuel back to the main fuel supply.

In the position indicated in the attached drawing, no fuel flows through the control line 23, but instead the fuel travels at full capacity through the main delivery line 22 and the control system to the combustion chamber.

If the speed of the turbine increases, causing the oxygen pressure to rise above an optimum value, bellows 1 expands, causing rod 3 and pin 4 to move to the right. Fulcrum arm 19 accordingly moves to the right, carrying with it rod 33, which results in pistons 34, 35 and 36 likewise moving to the right. Fuel enters through the opening 37 into a chamber 40 within member 32 and through tube 31 into compartment 29, causing piston 27 to move to the left and forcing liquid from compartment 29A through tube 30 into a compartment 41 out the opening 38 back to the supply. Piston 25 throttles the amount of fuel passing through the chamber 24 into the oxygen control device, decreasing the amount of fuel and oxygen entering the combustion chamber and, consequently, decreasing the speed of the turbine until pin 4 returns to its optimum operating position.

If the speed of the turbine decreases to too low a value, on the other hand, the pressure of the oxygen decreases, causing rod 3 and pin 4 to move to the left of the optimum position. This movement, in turn, results in arm 19 moving to the left, causing rod 33 to move to the left and with it the pistons 34, 35 and 36. Fuel enters through the opening 37 into compartment 41 and through tube 30 into compartment 29A, causing the piston 27 to move to the right along with piston 25, which removes the restrictions from the chamber 24. The flow of fuel through the oxygen control device to the combustion chamber is increased and, consequently, the speed of the turbine also is increased. When liquid goes through tube 30 into compartment 29A, the liquid from compartment 29 goes through tube 31 into compartment 40 and, since the piston 34 has moved to the left of the opening 39, the liquid in compartment 40 exits through the opening 39 and back to the main supply for the fuel.

As mentioned above, the manual control valve 20 has a primary influence on the flow of liquid through the automatic control system and the oxygen control device into the combustion chamber. The manual control valve 20 comprises a cylindrical member 42 through which there extends a rod 43. This rod carries two cams 44 and 45 in operative engagement respectively with switches 51, 52, a port 46 for controlling the flow of liquid to the power piston, and a handle member with a plurality of notches therein for regulating the position of the rod 43. A linkage mechanism 64 is provided for controlling the position of rod 43 within the manual control cylinder 20. The port 46 is an indentation in the rod 43, so arranged as to form a cavity, and when the rod is moved to the normally closed position, an edge 47 on rod 43 completely closes the opening from the cavity into a tube or line 22A. As rod 43 is moved to the right, liquid is allowed to flow through tube 22 into the cavity and then through the tube 22A to the port 24.

The plurality of notches are designed to operatively engage a spring detent 49 which holds the rod 43 in any of the notched positions. The operation of the subject control mechanism depends upon the notch which is engaged by the spring detent 49, as will be shown in the operating description hereinafter given.

Before describing the operation of the manual control valve, it is necessary to describe the functions of a supply of nitrogen provided through a passage 50. The nitrogen has the dual functions of purging the combustion chamber and of starting the gas turbine. In its purging capacity, the nitrogen is sent through the combustion chamber 16 via line 50, valve 54, and the upper part of line 11 in order to dilute or remove any oxygen that might be remaining from the last operating cycle to prevent the possibility of an explosion when fuel enters the combustion chamber.

In its starting assist capacity, the nitrogen is sent via lines 50 and 79 through a starting nozzle 65 in the gas turbine, causing it to turn at a slow speed so as to supply some pressure to the output of the two fuel pumps. The pressure thus built up is enough to cause fuel and oxygen to enter the combustion chamber, be burned, and increase the speed of the gas turbine to normal operating level.

The nitrogen for purging and for the starting assist is stored in a high pressure bottle (not shown) of such dimensions that it is able to supply the nitrogen at a pressure of the order of 1500 pounds per square inch. Although the primary object of this invention is to eliminate heavy thick-walled storage vessels, the detrimental effect of the weight of the supply of nitrogen is not enough to cause any serious impediment to the operation of the airplane, since the amount used is small in comparison with the amounts of liquid fuel and oxygen.

As mentioned above, rod 43 has two cams 44 and 45 that actuate, respectively, switches 51 and 52. Switch 52 in the closed position supplies electrical current through the operating solenoids (not shown) of a pair of valves 53 and 54 in the nitrogen line, permitting nitrogen to perform its purging and starting assist functions. Switch 52 performs the additional function of closing the nitrogen starting assist valve 53 and deenergizing the ignition system (not shown) of the combustion chamber. Switch 51 closes the nitrogen purge valve 54, opens oxygen valve 55, and energizes the ignition system of the combustion chamber. The relation of the cams 44 and 45 to the switches 51 and 52 to the control system will be described during the description of the operation cycle.

As has been previously stated, rod 43 of the manual control valve has a plurality of notches for engagement with spring detent 49. The six positions for this spring detent are determined by four single notches 71, 72, 73 and 76, and a double notch 74, 75 in which the intervening length of rod 43 is missing.

The operating characteristics of the rocket engine depend upon the relation of rod 43, and the spring detent 49. In the off position, for instance, the spring detent is in notch 71. In order to start the engine, it is necessary to move the manual control arm linkage 64 to cause rod 43 to move under the spring detent gradually from notch 71 to notch 76, the running position. As the manual control arm moves from notch 71 to notch 76, the engine passes through various stages of operation.

When detent 49 engages notch 72, nitrogen in its purging capacity is supplied to the combustion chamber to remove any excessive oxygen that may be present from the last operation. At the same time starting assist nitrogen is admitted to the starting nozzle of the gas turbine. Thus, at position 72 of rod 43, switch 52 is actuated, opening the two solenoid valves 53, 54 in the nitrogen line admitting purging nitrogen into the combustion chamber, and admitting starting assist nitrogen through line 79 to the starting nozzle 65 in the gas turbine.

At position 73 of rod 43, raw fuel is admitted to the combustion chamber since the rod 43 and edge 47 move to a position that makes it possible for fuel to pass from line 22 through chamber 46 and line 22A to the port 24 operated by the power piston, thence through line 22b, compartment 10, and line 80.

At position 74, switch 51 is actuated, closing the nitrogen purge valve 54, opening oxygen valve 55, and supplying electrical power to an ignition device or igniter 66 which causes the burning of the oxygen and fuel in the combustion chamber. Since this is a self-sustaining combustion, power is sent to the ignition device only long enough to insure combustion.

The double notch, 74, 75 on rod 43 is the accelerating position. That is, the amounts of fuel and oxygen directed to the combustion chamber are gradually increased until the gas turbine reaches optimum speed. The absence of the intervening rod length between notches 74 and 75 gives a smoother accelerating period.

At position 75 of rod 43, switch 52 is deactuated, shutting off the ignition and closing nitrogen valve 53, which shuts off the starting assist nitrogen.

When rod 43 is moved to position 76, this is the normal operating position in which rod remains until the machine is shut down.

In addition to the elements of the control system that have already been described, I provide a safety feature which performs the function of shutting down the machine in case the gas turbine reaches a predetermined percentage of overspeed. A tachometer generator (not shown) on the turbine shaft impresses a voltage across a solenoid 56. At a predetermined percentage of overspeed this voltage reaches a value such that the solenoid attracts a lever 57, causing a detent 58 to be withdrawn from a rod 59 so that a spring 60 draws the rod 59 out of operating contact with a control lever 61. A biasing spring 62 causes the control lever 61 to force the rod 43 to its normally closed position, shutting down the gas turbine. When the turbine slows down, the rod 59 may be again operatively connected to the control lever 61 by means of a pilot reset lever 63, and operation is resumed.

Modifications of this invention will occur to those skilled in the art and it is desired to be understood, therefore, that this invention is not to be limited to the particular arrangement disclosed, but that the appended claims are meant to cover all the modifications which do not depart from the spirit and scope of this invention.

What I claim as new and desire to secure by Letters Patent of the United States is:

1. In a rocket propellant feed system, a fuel pump, a liquid oxygen pump, a combustion chamber, a control system for regulating the pressure output of said pumps by controlling the amount of fuel and oxygen supplied to the combustion chamber, said control system comprising a bellows having an expansible portion responsive to the pressure output of said liquid oxygen pump, an oxygen control device for regulating the flow of oxygen to said combustion chamber, said oxygen control device defining an oxygen compartment and a liquid fuel compartment therein, valve means within said oxygen control device for regulating the pressure in said oxygen compartment in response to the pressure in said liquid fuel compartment, control means responsive to said bellows for regulating the pressure of the liquid fuel supplied to said fuel compartment of said oxygen control device, and manual means for adjusting the effect of said bellows.

2. In a rocket propellant feed system, a fuel pump, a liquid oxygen pump, means for operating said pumps, a combustion chamber the gaseous products of which are used to drive the pump operating means, a bellows having an expansible portion responsive to the liquid oxygen pump, and a control system for regulating the pressure of the fuel and liquid oxygen at the output of the pumps, said control system comprising an oxygen control device for varying the flow of oxygen to said combustion chamber and accordingly controlling the speed of the pump operating means and the pressure at the output of said pumps, said oxygen control device having an oxygen compartment and a fuel compartment therein with means for regulating oxygen pressure in response to the fuel pressure, control means for regulating the pressure of fuel supplied to the oxygen control device, said control means comprising a manually controlled portion and an automatically controlled portion, said manually controlled portion regulating the supply of fuel to the automatically controlled portion, said automatically controlled portion being responsive to the position of said expansible portion of said bellows to vary the pressure of a liquid fuel supplied to said oxygen control device.

3. In a rocket propellant feed system, a fuel pump, a liquid oxygen pump, a gas turbine for operating said pumps, a combustion chamber the gaseous products of which are used to drive said gas turbine, a bellows responsive to the pressure at the output of the liquid oxygen pump, and a control system for regulating the pressure of the fuel and liquid oxygen at the output of the pumps, said control system comprising an oxygen control device for varying the flow of oxygen metered to the combustion chamber and accordingly controlling the speed of the gas turbine and the pressure at the output of the pumps, said oxygen control device defining an oxygen compartment and a fuel compartment therein with means for regulating the pressure in said oxygen compartment in response to the pressure in said fuel compartment, and a control means actuated by said bellows for regulating the pressure of the fuel to the oxygen control device.

References Cited in the file of this patent

UNITED STATES PATENTS

| Number | Name | Date |
|---|---|---|
| 1,052,588 | Janicki | Feb. 11, 1913 |
| 1,257,070 | Discher | Feb. 19, 1918 |
| 2,397,657 | Goddard | Apr. 2, 1946 |
| 2,397,659 | Goddard | Apr. 2, 1946 |
| 2,407,852 | Smith | Sept. 17, 1946 |
| 2,429,005 | Watson et al. | Oct. 14, 1947 |
| 2,479,888 | Wyld et al. | Aug. 23, 1949 |
| 2,519,624 | Ballantyne et al. | Aug. 22, 1950 |
| 2,531,761 | Zucrow | Nov. 28, 1950 |
| 2,559,814 | Whittle | July 10, 1951 |

FOREIGN PATENTS

| Number | Country | Date |
|---|---|---|
| 113,026 | Australia | May 2, 1941 |